United States Patent [19]
Van Benschoten, Jr. et al.

[11] Patent Number: 5,970,696
[45] Date of Patent: Oct. 26, 1999

[54] RAKE ADJUSTABLE BETWEEN A RIGHT-HANDED AND A LEFT-HANDED POSITION

[75] Inventors: Richard P. Van Benschoten, Jr., 265 E. 66th St., Apartment 42B, New York, N.Y. 10021; Thomas DeMare, Flanders, N.J.

[73] Assignee: Richard P. Van Benschoten, Jr., New York, N.Y.

[21] Appl. No.: 08/989,201

[22] Filed: Dec. 11, 1997

[51] Int. Cl.$^6$ .................................................. A01D 7/00
[52] U.S. Cl. .................................... 56/400.18; 56/400.19
[58] Field of Search .......................... 56/400.01, 400.04, 56/400.17, 400.18, 400.19; 294/53.5

[56] References Cited

U.S. PATENT DOCUMENTS

| | | |
|---|---|---|
| 31,113 | 1/1861 | Esterly . |
| D. 198,699 | 7/1964 | Hill et al. ................................... D39/1 |
| 567,364 | 9/1896 | Snyder . |
| 654,645 | 7/1900 | Keiller .............................. 56/400.01 X |
| 678,519 | 7/1901 | Robinson .............................. 56/400.19 |
| 693,986 | 2/1902 | Simpson ............................... 56/400.19 |
| 966,602 | 8/1910 | Ross .................................. 56/400.18 X |
| 1,267,654 | 5/1918 | Gilson . |
| 1,872,852 | 8/1932 | Van Nieuwenhuyzen . |
| 2,032,954 | 3/1936 | Reichard .............................. 56/400.18 |
| 2,056,411 | 10/1936 | Schulz .................................. 56/400.01 |
| 2,083,786 | 6/1937 | Jerner et al. ......................... 56/400.18 |
| 2,222,163 | 11/1940 | Austin .................................. 56/400.18 |
| 2,321,489 | 6/1943 | Kaufman .............................. 56/400.17 |
| 2,413,827 | 1/1947 | Herst .................................... 56/400.17 |
| 2,456,876 | 12/1948 | Keller et al. ......................... 56/400.17 |
| 2,479,877 | 8/1949 | Storm et al. ............................ 172/373 |
| 2,532,526 | 12/1950 | Wells .................................... 56/400.18 |
| 2,767,545 | 10/1956 | Jenkins ............................ 56/400.18 X |
| 4,086,750 | 5/1978 | White .................................. 56/400.18 |
| 4,292,794 | 10/1981 | Gascon ............................ 56/400.18 X |
| 4,312,095 | 1/1982 | Mullins ................................ 56/400.14 |
| 4,378,671 | 4/1983 | Gascon ............................ 56/400.04 X |
| 4,406,113 | 9/1983 | Mullins ............................ 56/400.14 X |
| 4,791,780 | 12/1988 | Phillips ................................ 56/400.04 |
| 4,996,834 | 3/1991 | Geist .................................... 56/400.17 |
| 5,454,218 | 10/1995 | Van Benschoten, Jr. ............ 56/400.17 |
| 5,467,590 | 11/1995 | Mencarelli et al. ................. 56/400.17 |
| 5,626,009 | 5/1997 | Bower et al. .................... 56/400.18 X |

FOREIGN PATENT DOCUMENTS

| | | | |
|---|---|---|---|
| 878734 | 10/1961 | United Kingdom ................ | 56/400.01 |

*Primary Examiner*—Victor Batson
*Attorney, Agent, or Firm*—Jeffrey H. Ingerman; Joel Weiss

[57] ABSTRACT

A rake that can be adjusted between a right-handed position and a left-handed position is provided. The rake has a handle, and raking fingers forming a first raking fan and a second raking fan each having a raking edge. The raking fingers are pivotably attached to a crossbar that is pivotably attached to the handle. An actuator is provided allowing a user to pivot the crossbar relative to the handle, causing the raking fingers to move closer together on one side of the handle and to diverge on the other side of the handle, so as to provide a rake having one larger raking edge, and one smaller raking edge. Such a rake eliminates the inconvenience created by either the raking edge, or the leaves, passing over the user's feet during raking, while providing the ability to quickly adjust to right-handed or left-handed use.

9 Claims, 13 Drawing Sheets

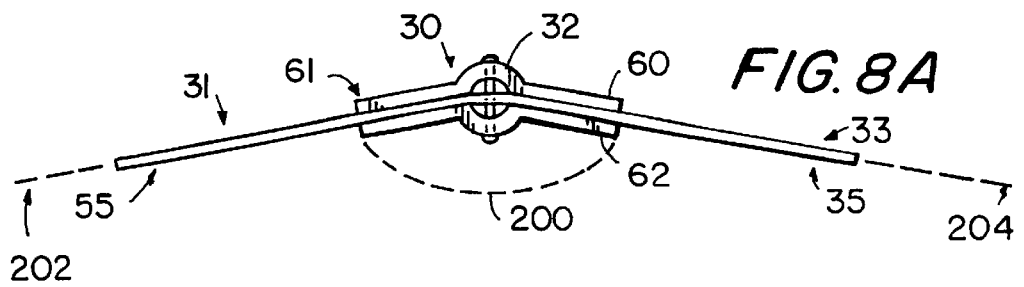
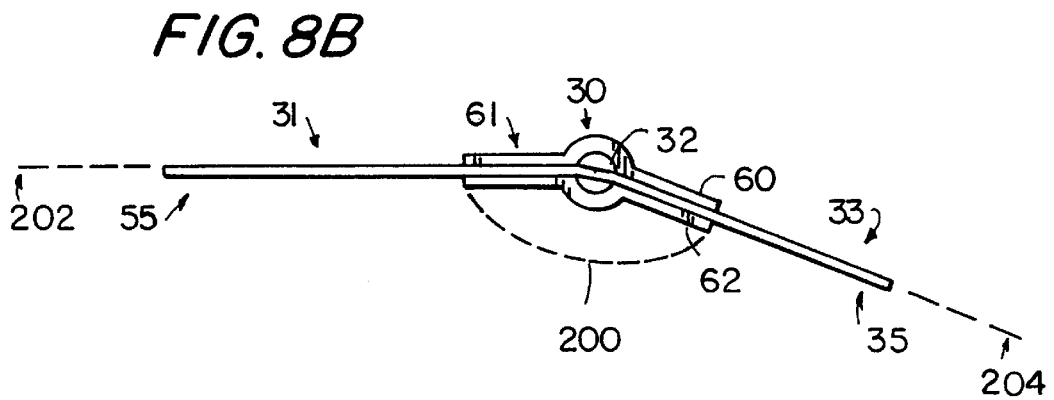
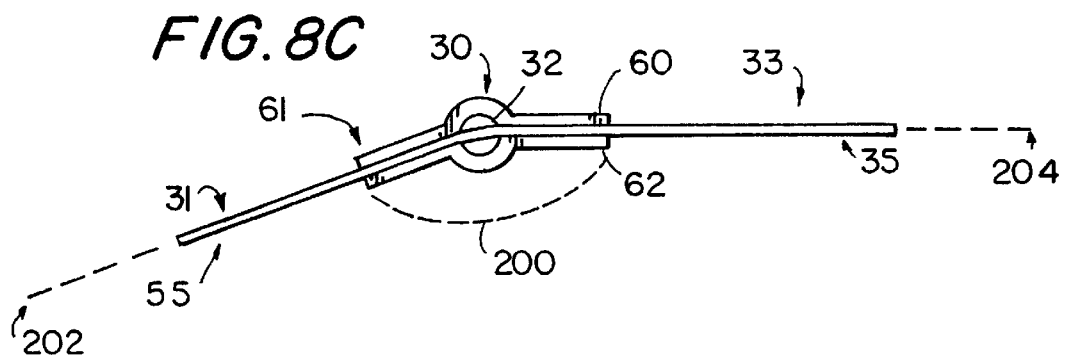
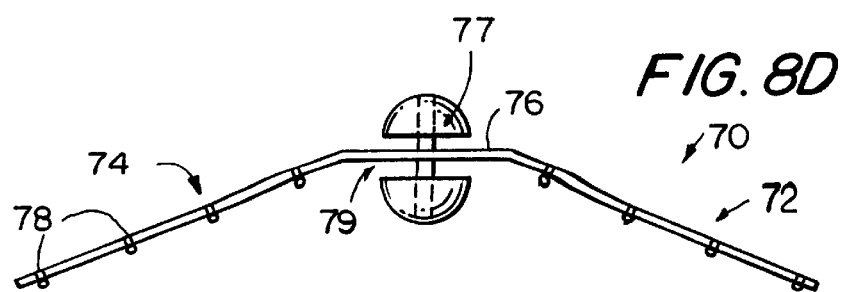

5,970,696

RAKE ADJUSTABLE BETWEEN A RIGHT-HANDED AND A LEFT-HANDED POSITION

BACKGROUND OF THE INVENTION

The present invention relates to lawn rakes. More particularly, the present invention relates to lawn rakes having an adaptable shape to control the movement of leaves.

Previously known rakes generally have a group of raking fingers which fan out to form a raking edge. The raking fingers usually extend from a support base which is fastened to a handle, or individual fingers may extend directly from a central point along the handle. The raking fingers may form a slightly arcuate surface, and the ends of the fingers themselves may form a slightly arcuate raking edge. However, flat rakes with straight raking edges are also known.

When raking leaves, or other materials, it is advantageous to have a large raking edge so that a reasonably large amount of leaves may be moved by a single stroke of the rake. However, previously known rakes having a large raking edge suffer from certain disadvantages. For example, the raking fingers nearest the user may pass over the user's feet and deposit leaves and other debris on the user's feet and shoes. Secondly, even if the fingers themselves do not pass over the user's feet, leaves may spill out from the side of the rake onto the user's feet. Attempting to hold the rake further from the body while raking in order to overcome this problem may be tiresome and awkward.

Providing a smaller raking edge may remedy the problem of the raking fingers or leaves passing over the user's feet. However, this solution is not satisfactory because it also decreases the amount of material which may be moved by the rake in a single stroke, thereby forcing the user to make several passes with the rake.

U.S. Pat. No. 5,454,218, which is hereby incorporated by reference in its entirety, shows a rake that substantially eliminates or reduces the degree to which raking fingers pass over a user's feet while still raking a reasonable amount of material in a single stroke. The rake of Pat. No. 5,454,218 has two raking fans, one on either side of the handle. The two fans are of different sizes and are at an angle one with the other. The rake is used by holding it such that the smaller fan is toward the user and the larger fan is substantially perpendicular to the direction of raking. However, the rake is fixed in handedness. That is, it is constructed either for a right-handed person or a left-handed person, but not for both. This requires rake manufacturers to produce two distinctly different types of rakes. It is also difficult for a user of the rake to switch hands in the middle of raking to alleviate fatigue.

It would be desirable to provide a rake that, while allowing a user to rake a relatively large amount of leaves in a single stroke without having the rake or the leaves pass over the user's feet, can be adapted to right-handed or left-handed users.

It would be further desirable to provide such a rake that a right-handed or left-handed user is able to quickly adapt to either left-handed or right-handed use to dispel fatigue.

SUMMARY OF THE INVENTION

It is an object of this invention to provide a rake that, while allowing a user to rake a relatively large amount of leaves in a single stroke without having the rake or the leaves pass over the user's feet, can be adapted for right-handed or left-handed users.

It is a further object of this invention to provide a rake that a right-handed or left-handed user is able to quickly adapt to either left-handed or right-handed use to dispel fatigue.

In accordance with this invention, a rake is provided having a handle with a longitudinal axis, and a plurality of raking fingers forming a first fan and a second fan. The fans define a first tangent plane and a second tangent plane which are tangent to the first and second fans, respectively, substantially along a line at which the first and second fans meet the longitudinal axis. The first and second tangent planes form an angle greater than 90° and at most 180° with respect to one another. Each of the raking fingers has a proximal end and a distal end. A clamp movably secures the proximal ends of the raking fingers to the handle. A crossbar having two segments meeting at a junction is pivotably attached to the handle at the junction. The two segments of the crossbar are bent at substantially the aforementioned angle. Each of the raking fingers is pivotably attached to the crossbar at a point between its proximal end and its distal end. The rake includes an actuator movable between a first and a second position, connected to the handle and to either the crossbar or one of the raking fingers, for pivoting the crossbar relative to the handle. The first fan forms a first raking edge, and the second fan forms a second raking edge. When the actuator is in the first position, the first raking edge is longer than the second raking edge. When the actuator is in the second position, the second raking edge is longer than the first raking edge.

BRIEF DESCRIPTION OF THE DRAWINGS

The above and other objects and advantages of the present invention will be apparent upon consideration of the following detailed description, taken in conjunction with the accompanying drawings, in which like referenced characters refer to like parts throughout, and in which:

FIG. 8A is an end view of the rake of FIG. 3, taken from line VIIIA—VIIIA of FIG. 3;

FIG. 8B is an end view of the rake of FIG. 4, taken from line VIIIB—VIIIB of FIG. 4;

FIG. 8C is an end view of the rake of FIG. 6, taken from line VIIIC—VIIIC of FIG. 6;

FIG. 8D is an enlarged end view of the rake of FIG. 3, taken from line VIIID—VIIID of FIG. 3;

DETAILED DESCRIPTION OF THE INVENTION

The present invention can be adapted to provide the advantages of the rake described in the above-incorporated patent for either right-handed or left-handed use. The present invention can assume a right-handed, left-handed or neutral position, as well as any other intermediate position between the right-handed and left-handed positions.

Figure 1:
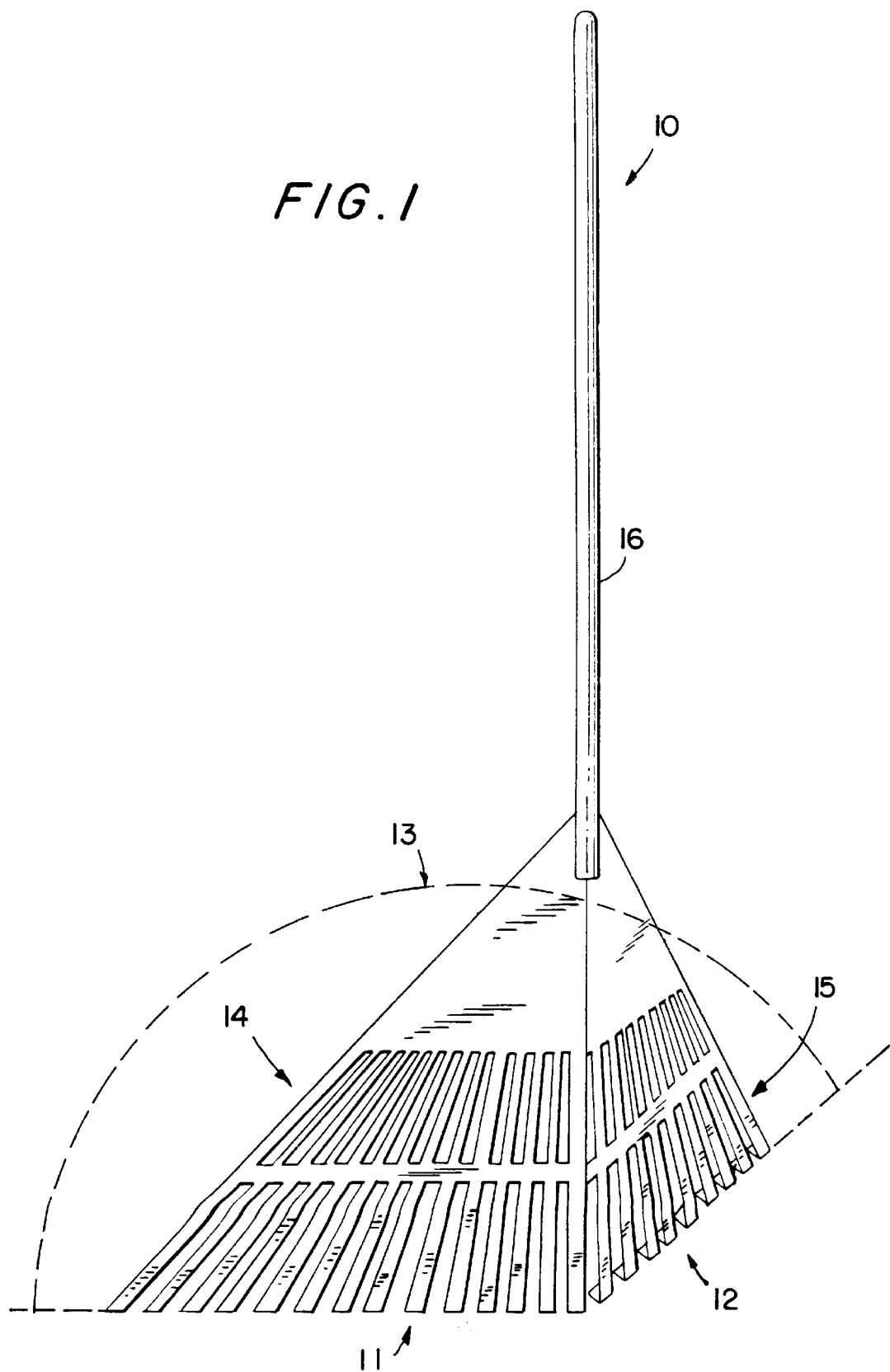
FIG. 1 is a top view of a right-handed rake.

The difference between a right-handed rake and a left-handed rake according to the above-incorporated patent can be explained with reference to FIGS. 1 and 2. Rake 10 of FIG. 1 is constructed for raking material across the front of a user's body to a position adjacent the right-hand side of the user because it has a large first fan 14 to the right of the handle 16, and a small second fan 15 to the left of handle 16, at an angle to first fan 14. Rake 10 is thus a right-handed rake. A user looking down the handle of such a rake while the raking edges are resting on the ground will see first, larger, raking edge 11 extending to the right of the handle, and second, smaller, raking edge 12 extending down and to the left. The ends of the raking fingers are bent in the direction of included angle 13. Angle 13 is preferably between about 120° and about 170°, and most preferably about 160°.

Figure 2:
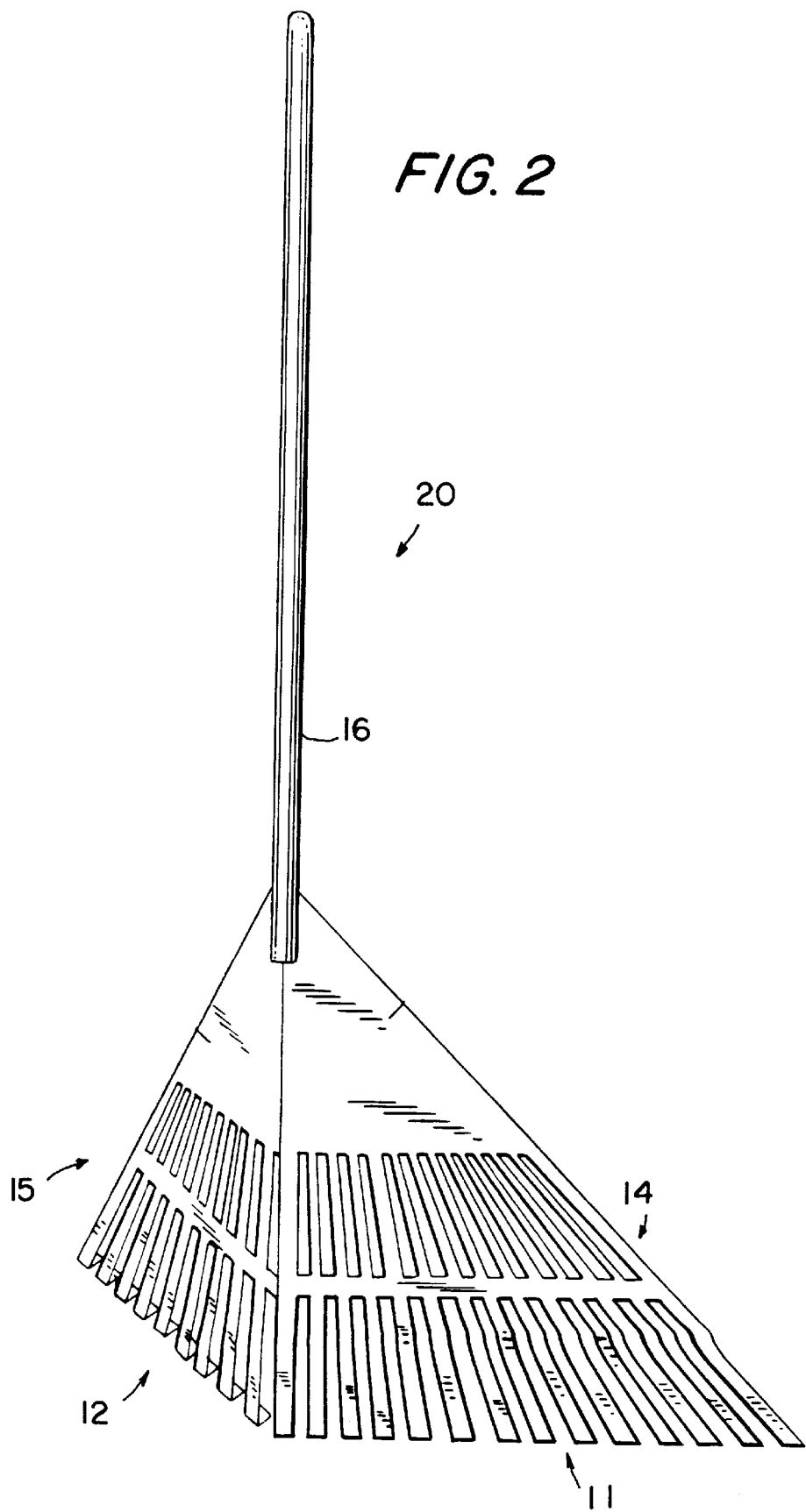
FIG. 2 is a top view of a left-handed rake.

A fixed, left-handed rake can be made by simply interchanging fans 14 and 15 as shown in FIG. 2. In left-handed rake 20 shown in FIG. 2, a user looking down the handle of the rake while raking edges 11, 12 are resting on the ground will see first, larger, raking edge 11 extending to the left of the handle, and second, smaller, raking edge 12 extending down and to the right.

In accordance with the present invention, a rake can be adjusted to assume the configuration of either rake 10 or rake 20, or any intermediate configuration. A preferred embodiment of a rake 30 constructed in accordance with the present invention can be understood with reference to FIGS. 3–10.

Rake 30 has a handle 32, an actuator 42, a clamp 61, a crossbar 70, a plurality of raking fingers 58 forming a first fan 31 and a first raking edge 55, and a plurality of raking fingers 38 forming a second fan 33 and a second raking edge 35. Each raking finger has a proximal end and a distal end, and preferably is attached at a point 78 between its proximal and distal ends to crossbar 70. Preferably, attachment points 78 of fingers 58, 38 are substantially uniformly spaced along crossbar 70.

As shown in FIGS. 8A–C, fans 31, 33 preferably meet at an angle 200 relative to one another. Angle 200 is preferably greater than 90° and less than 180°, more preferably between about 120° and about 170°, and most preferably about 160°. The tips 280 of raking fingers 58, 38 are preferably bent to form an angle of about 90°, as is well known in rakes. As is also well known, raking fingers 58, 38 may be made of, for example, plastic, metal, or other materials known for use in rakes.

Crossbar 70 preferably has two segments 72, 74, which can be either two parts of single piece of material, or two pieces of material attached to one another, deflected at angle 200 relative to one another. As shown in FIG. 8D, crossbar 70 also has a pivot area 76. Angle 200 of crossbar 70 preferably is substantially equal to angle 200 formed by fans 55, 35. Pivot area 76 by which crossbar 70 is pivotably attached to handle 32 preferably is a separate flat segment between segments 72, 74, or it could be a direct junction between segments 72, 74, which are at angle 200 one with the other. If pivot area 76 is an angled junction between segments 72, 74, pivot area 76 preferably is pivotably attached to the bottom side of the handle 32 (i.e., the side that faces the ground when the rake is in use), so that segments 72, 74 do not bind on handle 32 when crossbar 70 pivots. However, the pivot area preferably is a separate flat segment 76, as shown in FIG. 8D. When pivot area 76 is flat, pivot area 76 can be pivotably attached to the top or bottom side of handle 32, or, more preferably, can be pivotably received in a slot 79 in handle 32 as shown in FIG. 8D.

The proximal end of each individual raking finger 58, 38 is movably secured (preferably as described below) adjacent handle 32 such that each individual raking finger is able to move substantially longitudinally relative to handle 32 but not substantially transversely. Accordingly, when crossbar 70 pivots relative to handle 32, the proximal end of each raking finger 58, 38 can move freely along handle 32, but substantially cannot move away from handle 32. Therefore, as the shape of the triangles defined by crossbar pivot point 77, the pivotable attachment points 78 of each finger 58, 38 to crossbar 70, and the points at which each finger 58, 38 meets handle 32, change, the distal ends of fingers 58, 38 move closer together or farther apart. In particular, it can be seen that if segment 72 of crossbar 70 moves closer to the user, the ends of fingers 38 will move further apart while ends of fingers 58 will move closer together, whereas if segment 74 of crossbar 70 moves closer to the user, the ends of fingers 58 will move further apart while ends of fingers 38 will move closer together.

The pivoting of crossbar 70 is controlled by an actuator 42, which preferably includes a collar 40 secured about the handle 32 of rake 30. A substantially rigid link 45, preferably be made of a suitable stiff material such as steel or another metal, reinforced plastic, or another suitable material, is preferably attached at a first end to collar 40 and at a second end to that individual raking finger 37 on second fan 33, as shown, or alternatively to that individual raking finger 36 on first fan 31 (not shown), which is furthest from central longitudinal axis 50 of the handle 32. As the user moves collar 40, link 45 pushes or pulls on finger 37, which in turn pushes or pulls on crossbar 70. Alternatively, the second end of link 45 could be attached directly to crossbar 70 (not shown).

Figure 9A:
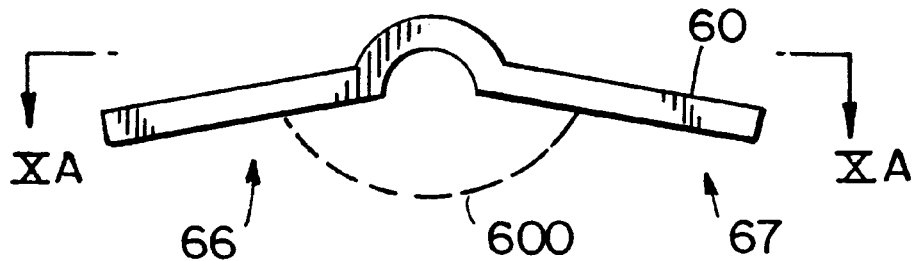
FIG. 9A is a side view of the top piece of a the clamp of a preferred embodiment of a rake according to the present invention.
Figure 9B:
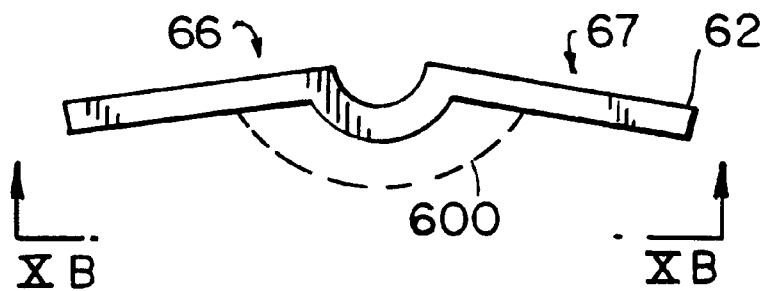
FIG. 9B is a side view of the bottom piece of a preferred embodiment of a clamp according to the present invention.
Figure 10A:
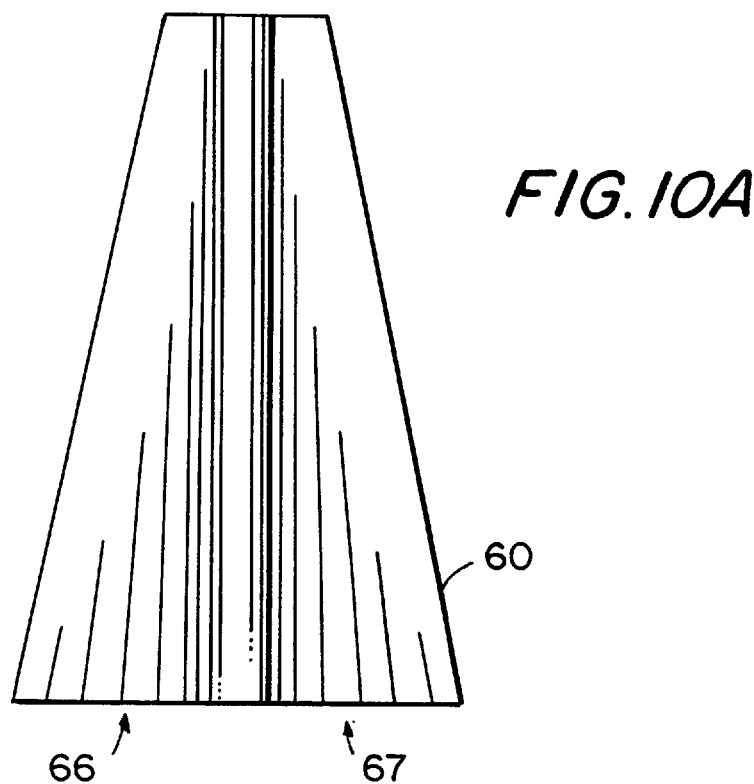
FIG. 10A is a top view of the top piece of the clamp taken from line XA—XA of FIG. 9A.
Figure 10B:
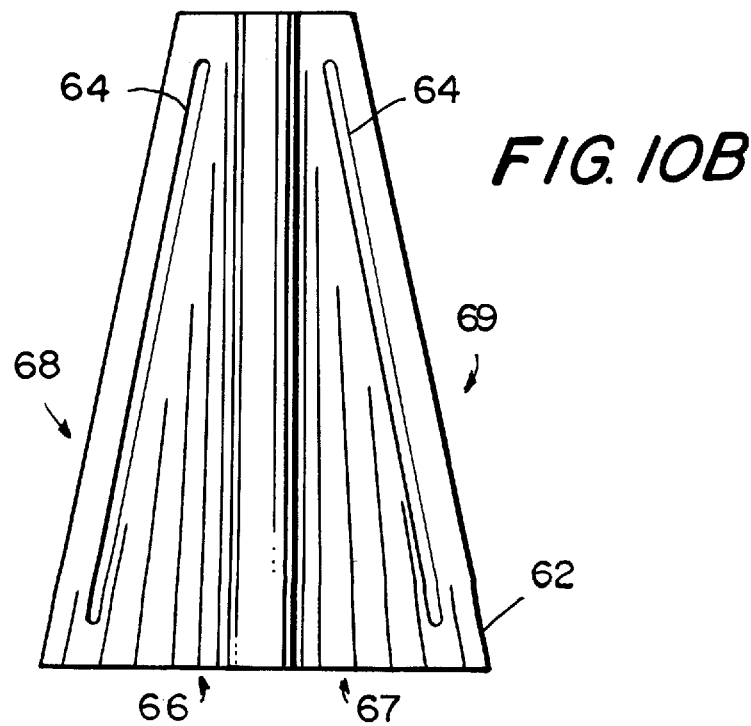
FIG. 10B is a bottom view of the bottom piece of the clamp taken from line XB—XB of FIG. 9B.

Preferably, fingers 58, 38 are movably secured to handle 32, as discussed above, by clamp 61, the components of a preferred embodiment of which are shown in detail in FIGS. 9A, 9B, 10A, and 10B. FIGS. 9A and 9B show a side view of top 60 and bottom 62 of clamp 61, each of which has a segment 66 for engaging the proximal ends of fingers 58, and segment 67 for engaging the proximal ends of fingers 38. Segments 66, 67 form angle 600 relative to one another, which preferably is substantially equal to angle 200. FIG. 10A shows the top view of top 60 of clamp 61. FIG. 10B shows the bottom view of bottom 62 of clamp 61. The two components of clamp 61 preferably are secured to one another about handle 32 of rake 30.

The respective fingers 58, 38 are captured between top and bottom pieces 60, 62 and so are prevented from leaving the planes of their respective fans 31, 33. Bottom 62 of clamp 61 preferably has slots 64 on either side, substantially along the length of its edges 68, 69. The proximal ends of raking fingers 36, 37 preferably are bent to form an angle preferably of substantially 90°. The bent proximal ends of raking fingers 37, 36 preferably run in slots 64. This arrangement guides raking fingers 37, 36 by movably securing their proximal ends so that they can move substantially only longitudinally, and substantially not transversely, when urged by link 45. The capture of the ends of outermost raking fingers 37, 36 in slots 64 also indirectly secures the proximal ends of all of the raking fingers against substantial transverse motion since raking fingers 36, 37 would be in the way of any other one of raking fingers 58, 38 that might move transversely away from handle 32. Alternatively, slots 64 can be in top 60 of clamp 61 instead of bottom 62, or one slot 64 can be in top 60 while another slot 64 is in bottom 62.

Figure 3:
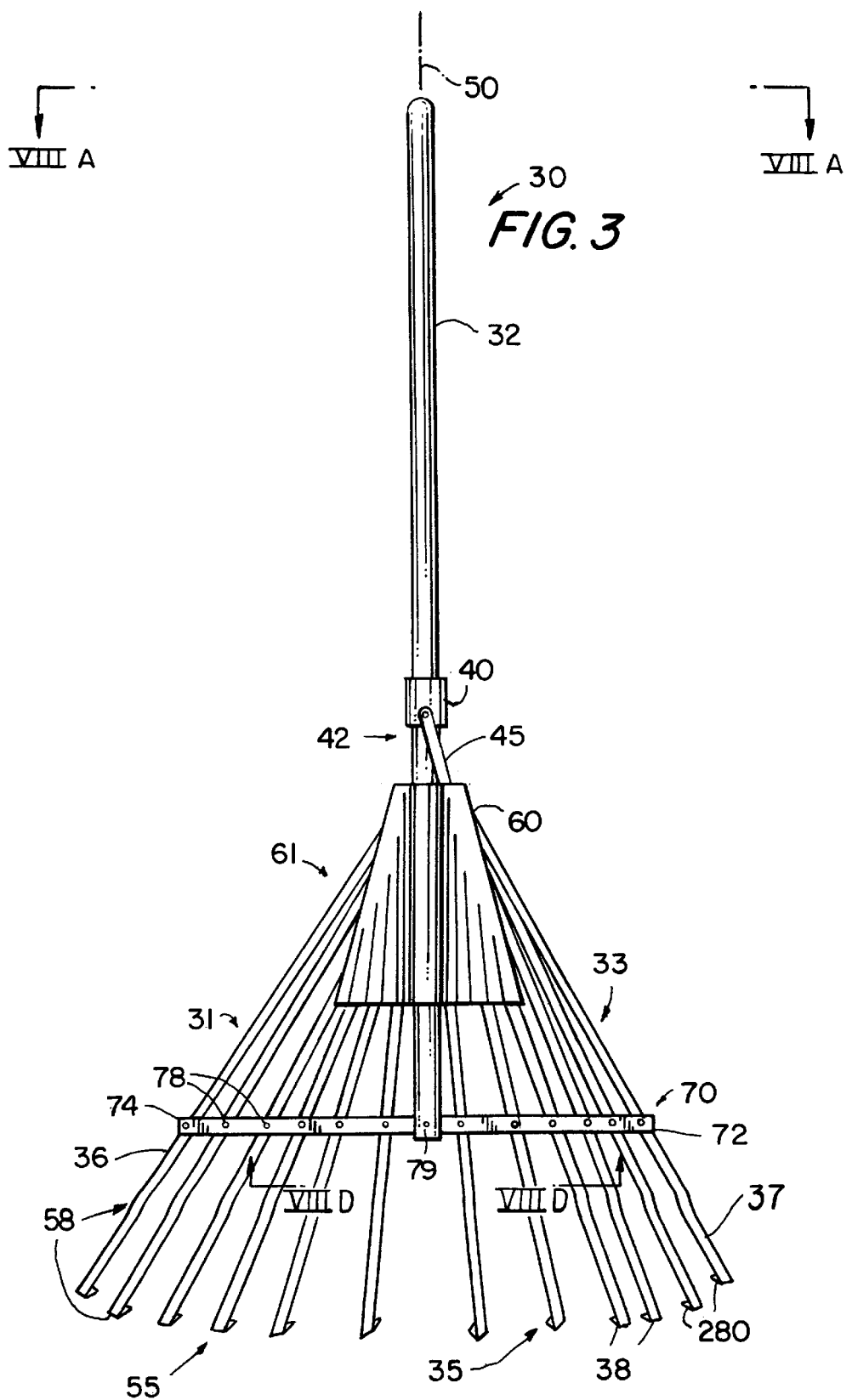
FIG. 3 is a top view of a preferred embodiment of a rake according to the present invention in a neutral position.

FIG. 3 shows rake 30 in a position in which the length of first raking edge 55 and the length of second raking edge 35 are substantially equal. This intermediate position is a result of collar 40 of actuator 42 being in a relatively intermediate position. It is neither in an extreme position toward clamp 61, nor in an extreme position away from clamp 61. In the intermediate position, the crossbar 70 is substantially perpendicular to the longitudinal axis 50 of rake handle 32. Therefore, the distal ends of fingers 58, 38 remain uniformly spaced, and the respective first and second raking edges 55, 35 remain substantially equal in length.

As explained above, when collar 40 is pulled in a direction away from clamp 61, link 45 pulls aforementioned raking finger 37. Raking finger 37 in turn pulls segment 72 of crossbar 70, which is the segment on the same side of longitudinal axis 50 of handle 32 as is raking finger 37. Because the proximal ends of raking fingers 58, 38 are constrained by clamp 61 against moving transversely relative to handle 32, the movement of crossbar 70, which is pivotably attached to all the raking fingers, spreads the distal ends of raking fingers 38 on second fan 33, lengthening second raking edge 35, while causing the distal ends of raking fingers 58 of first fan 31 to crowd together, shortening first raking edge 55. If actuator 42 is pushed toward clamp 61, the opposite occurs. Second raking edge 35 is shortened, and first raking edge 55 is lengthened as described above.

Figure 4:
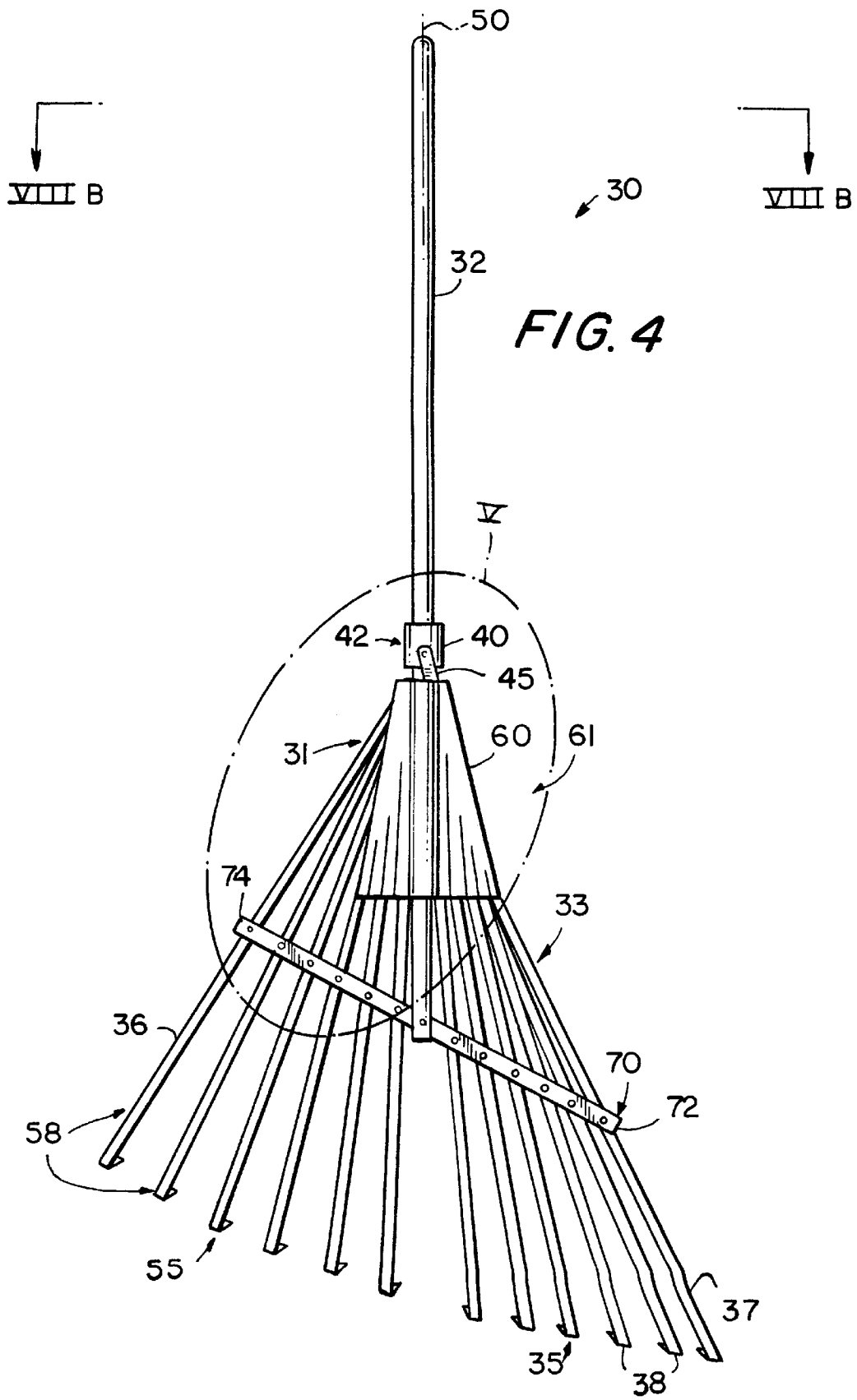
FIG. 4 is a top view of the rake of FIG. 3, in a right-handed position.
Figure 5:
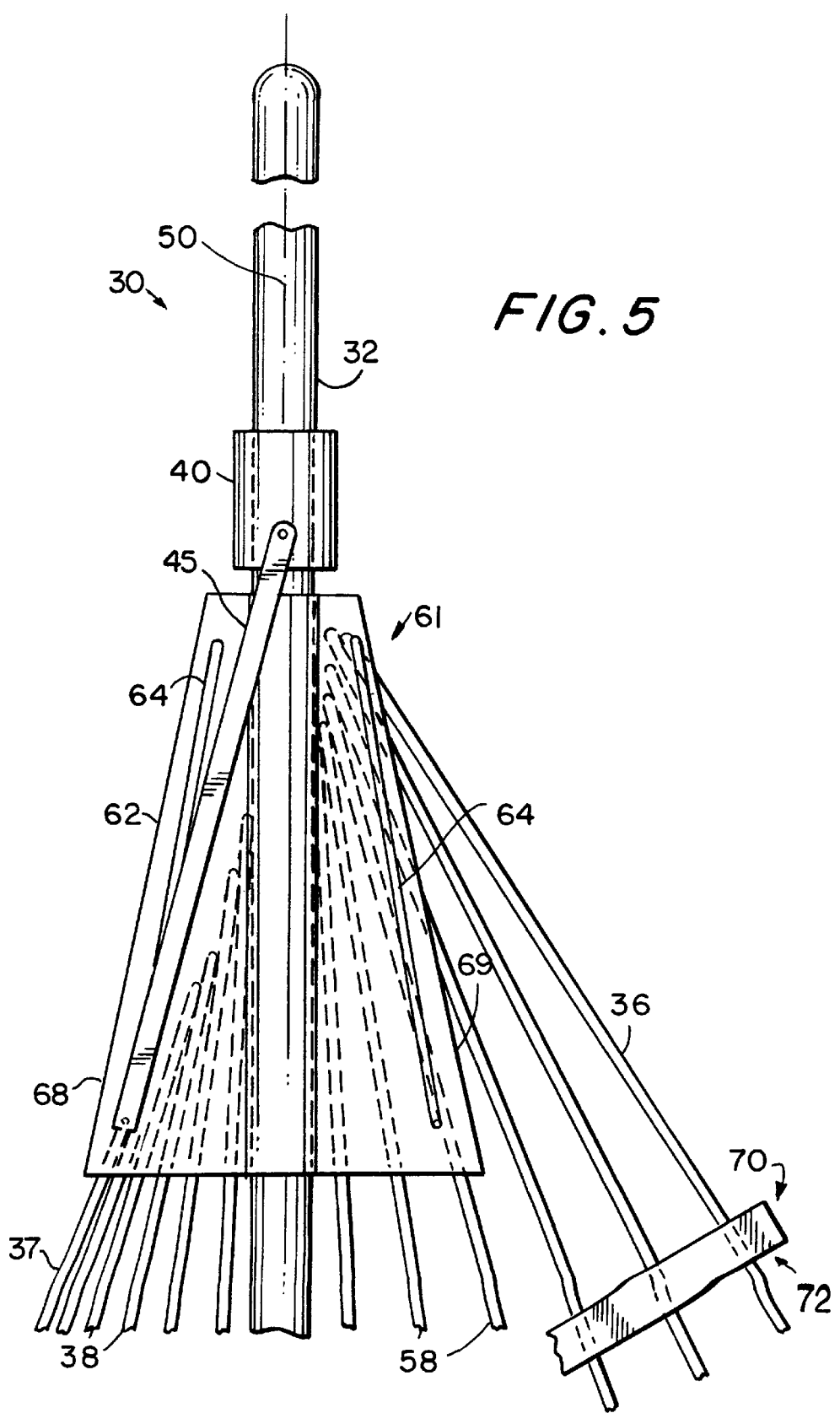
FIG. 5 is an enlarged bottom view of the portion of the rake of FIGS. 3 and 4 indicated by dashed line V of FIG. 4.

FIGS. 4 and 5 show rake 30 set in a right-handed position. FIG. 4 shows rake 30 as seen from above with raking fingers 58, 38 touching the ground. Collar 40 of actuator 42 is preferably adjacent to clamp 61. This position causes link 45 of actuator 42 to push raking finger 37 away from handle 32, thereby causing crossbar 70 to pivot. The pivoting action of crossbar 70 causes second raking edge 35 to shorten, and first raking edge 55 to lengthen, thus forming a right-handed rake as described above.

FIG. 5 shows how raking fingers 58, 38 are constrained by clamp 61 in the right-handed configuration. The proximal ends of fingers 58, 38 substantially cannot move transversely away from handle 32, but are at different longitudinal positions along handle 32.

Figure 6:
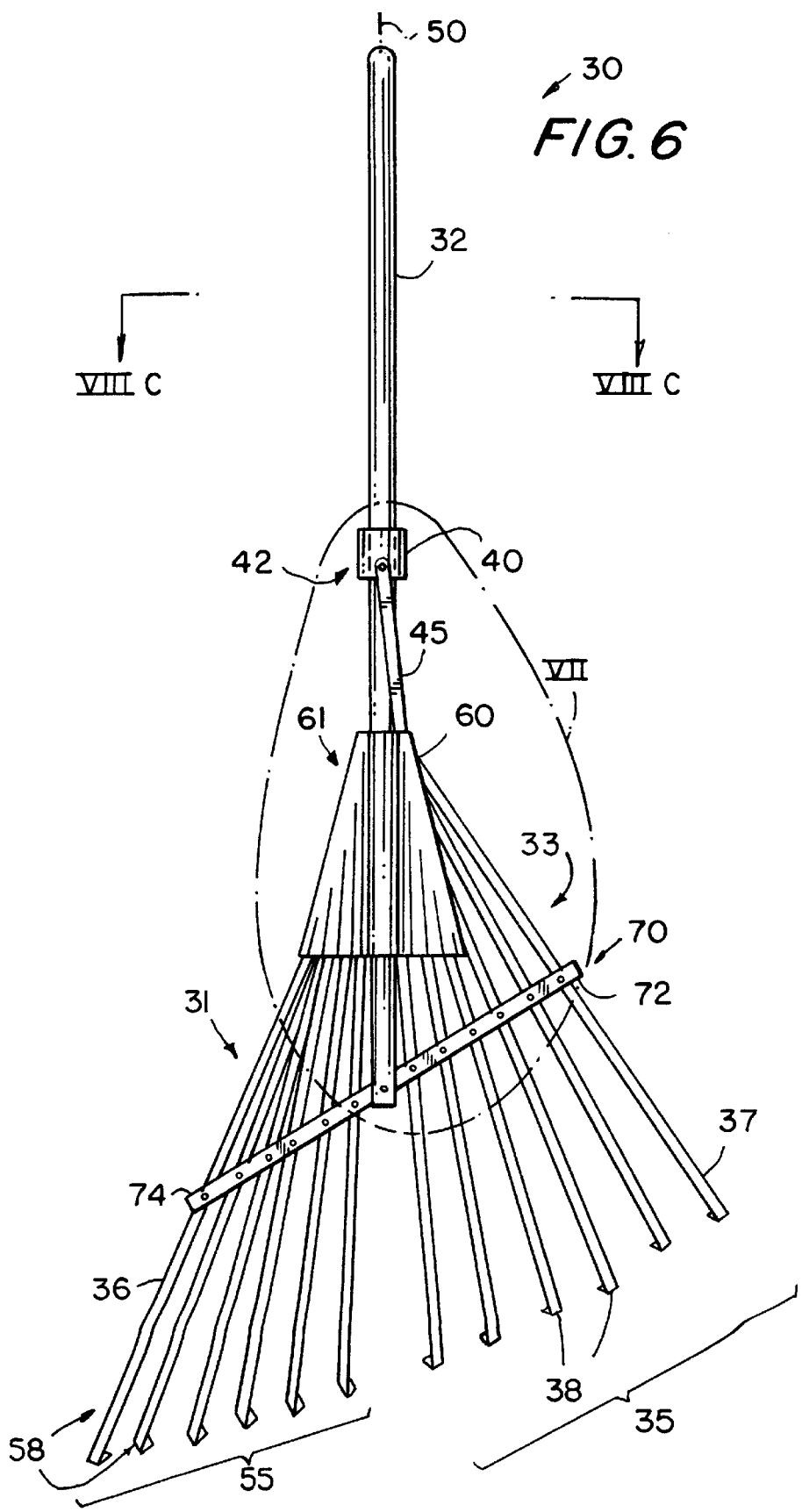
FIG. 6 is a top view of the rake of FIG. 3 in a left-handed position.
Figure 7:
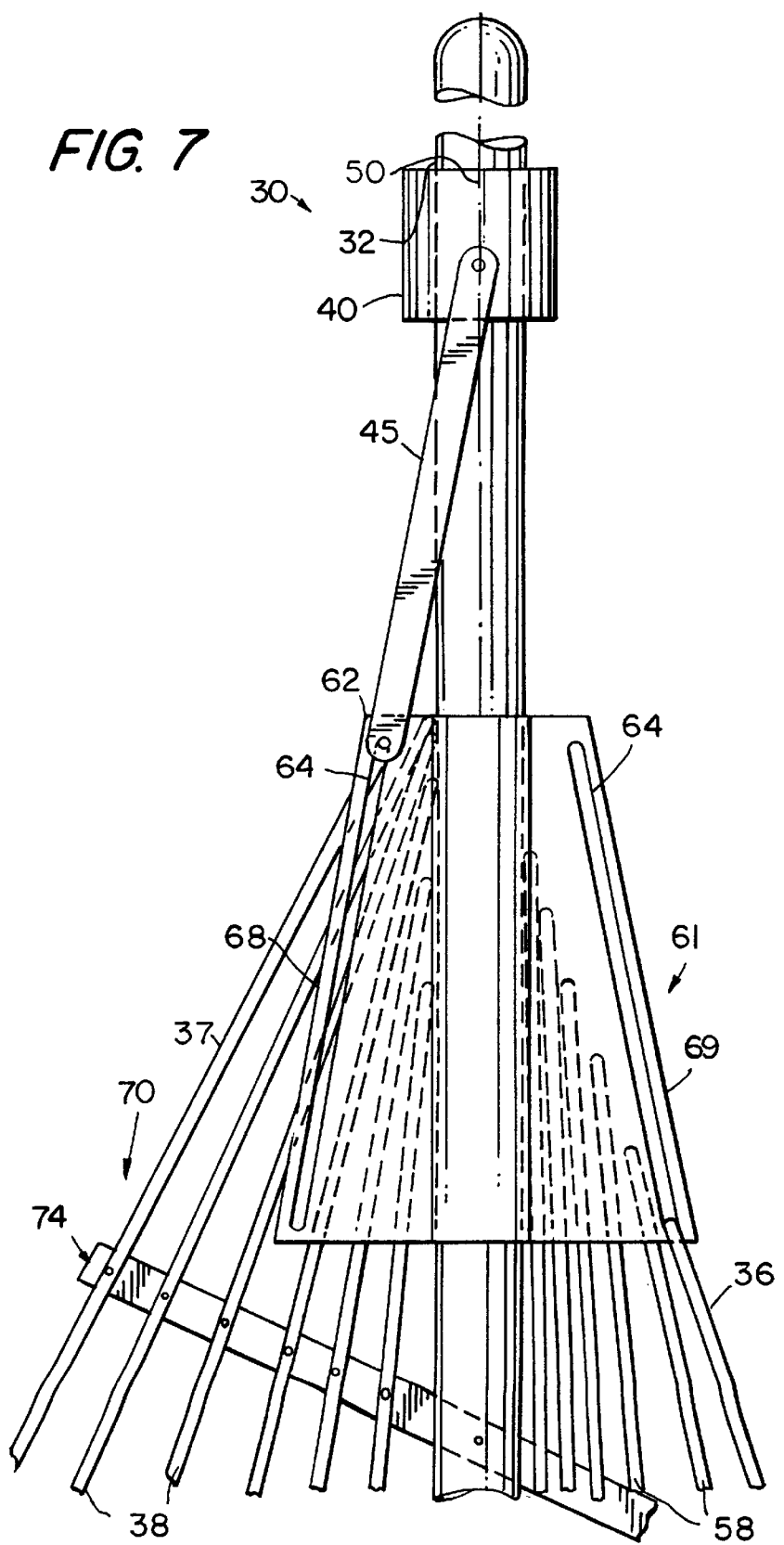
FIG. 7 is an enlarged bottom view of the portion of the rake of FIGS. 3 and 6 indicated by dashed line VII of FIG. 6.

FIGS. 6 and 7 show rake 10 set in a left-handed position. FIG. 6 shows rake 30 from above with collar 40 of actuator 42 pulled relatively far from clamp 61. This position, in turn, pulls link 45 of actuator 42, thereby pulling the distal end of raking finger 37 closer to handle 32 and causing crossbar 70 to pivot in a direction opposite the pivot direction of crossbar 70 in FIGS. 4 and 5. The pivoting action of crossbar 70 in FIG. 6 lengthens second raking edge 35, and shortens first raking edge 55, thus forming a left-handed rake as described above. FIG. 7, similar to FIG. 5, shows how raking fingers 58, 38 are constrained by clamp 61 in the left-handed configuration.

Figure 15:
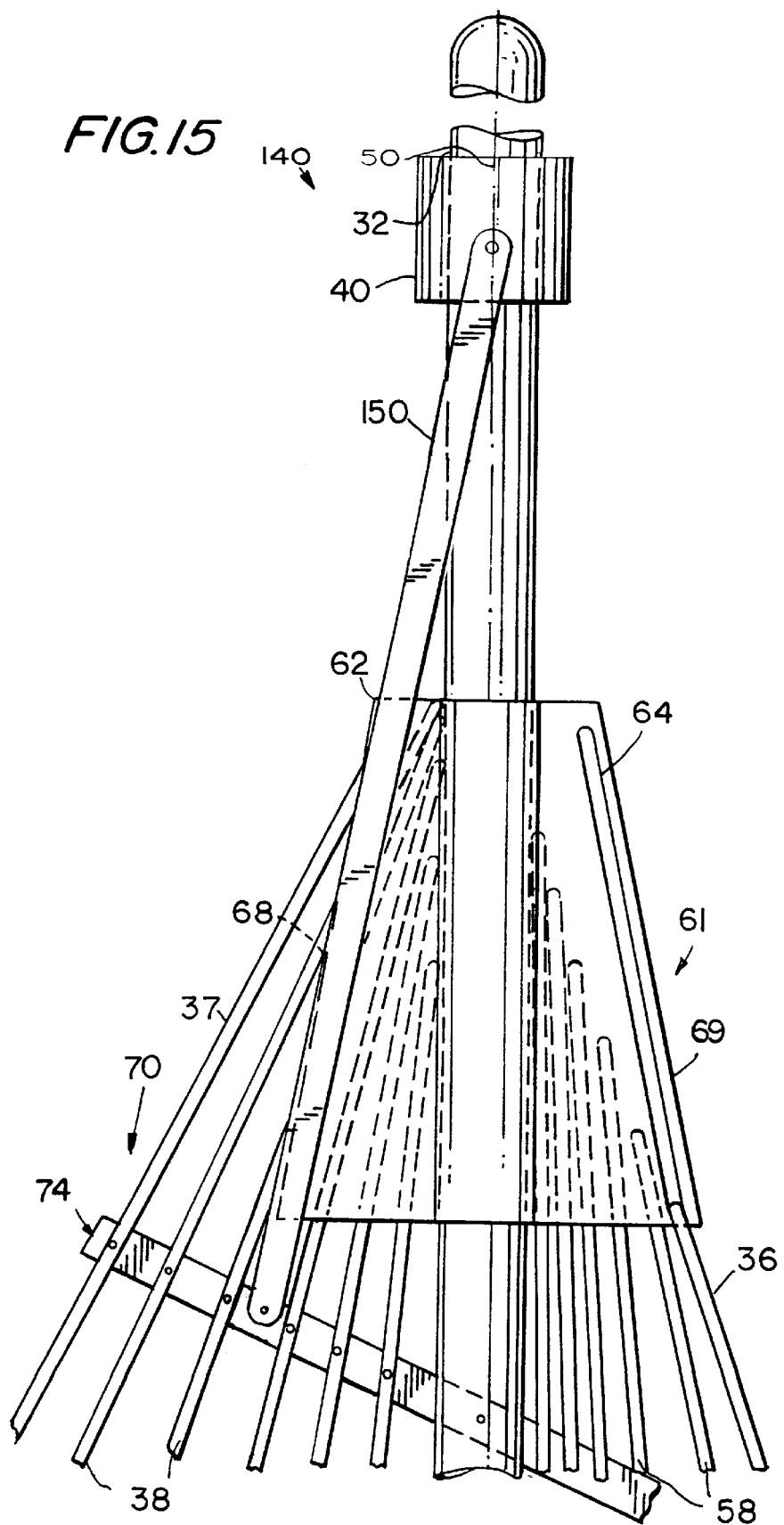
FIG. 15 is an enlarged bottom view of a rake according to the present invention.

In an alternative embodiment of the present invention, as discussed above and shown by rake 140 in FIG. 15, link 150 may connect collar 40 directly to crossbar 70 and not to raking finger 37. In this embodiment, slots 64 could (but need not) be eliminated, and clamp 61 could be provided with walls (not shown) that would restrain proximal ends of fingers 58, 38 from substantial transverse movement. Because it is no longer necessary to provide slots 64 to guarantee the longitudinal transmission of force down the length of each of raking fingers 36, 37, any additional transverse motion within clamp 61 of the ends of fingers 36, 37 that might result from the elimination of slots 64 would be acceptable.

Each of FIGS. 8A, 8B, and 8C shows an end view of rake 30 according to the present invention. FIG. 8A shows rake 30 in an intermediate position with first raking edge 55 substantially equal in length to second raking edge 35. FIG. 8B shows rake 30 in a right-handed position, wherein first raking edge 55 is longer than second raking edge 35. A user looking down handle 32 of rake 30 in such a position while the raking fingers are resting on the ground will see first raking edge 55 extending further from handle 32 than second raking edge 35. FIG. 8C shows rake 30 in a left-handed position whereby first raking edge 55 is smaller than second raking edge 35. A user looking down handle 32 while rake is in such a position will see second raking edge 35 extending further from handle 32 than first raking edge 55. FIGS. 8A–C also show the angle 200 formed by tangent planes 202 and 204, which are tangent to the two fans, respectively.

Figure 11:
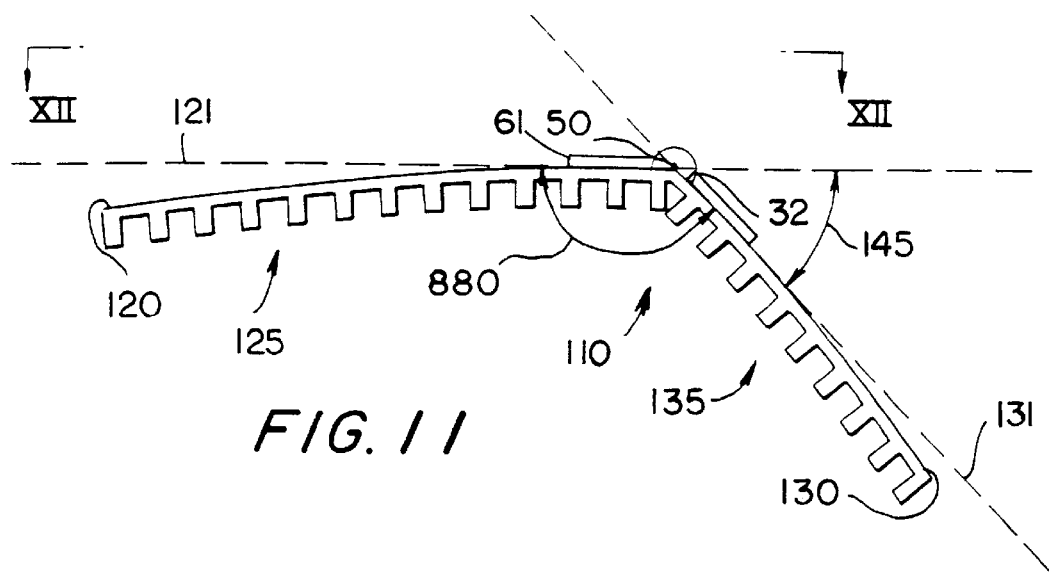
FIG. 11 is an end view of a preferred embodiment of a rake having arcuate raking edges according to the present invention.
Figure 12:
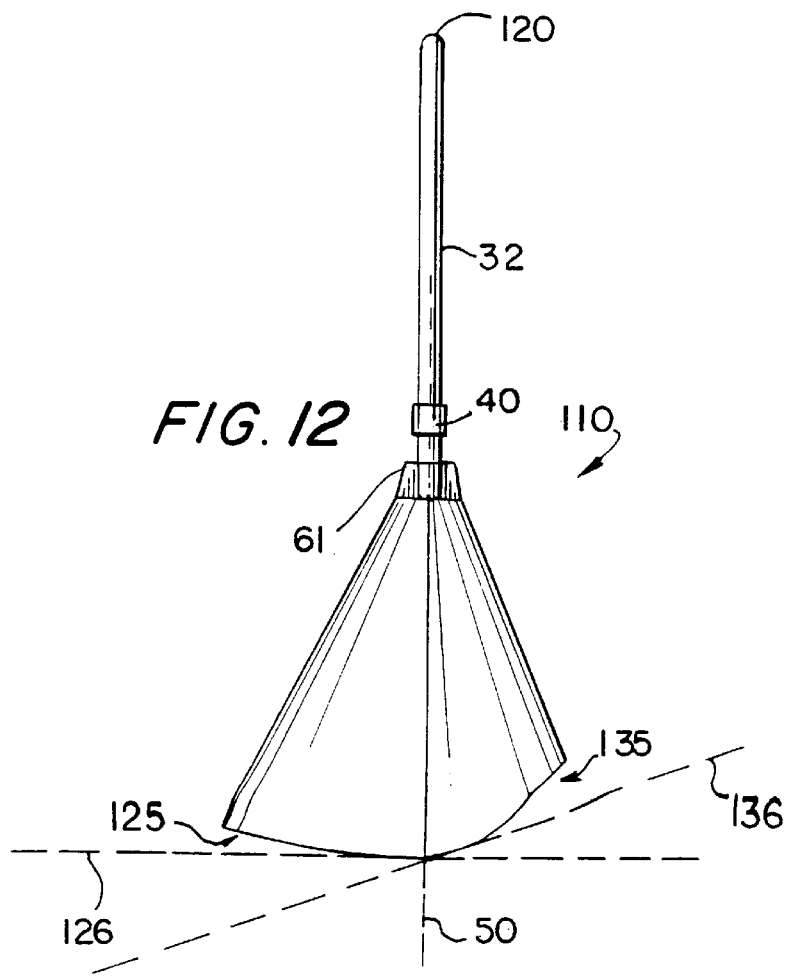
FIG. 12 is an elevational view of the rake of FIG. 11 taken from line XII—XII of FIG. 11.

In another preferred embodiment 110 shown in FIGS. 11 and 12, first fan 120 and second fan 130 are slightly curved. As shown in FIG. 12, the first and second raking edges 125, 135 may also be curved slightly toward the user's end 120 of handle 32 as they extend away from longitudinal axis 50 of handle 32. First fan 120 and second fan 130 therefore form arcuate surfaces, and first raking edge 125 and second raking edge 135 form arcuate raking edges.

In order to determine the angle of second fan 130 relative to first fan 120 it is useful to construct tangent planes to each of the fans. A first tangent plane 121 can be defined which is tangent to first fan 120 substantially along the line at which fan 120 meets longitudinal axis 50. A second tangent plane 131 can be defined substantially along the line at which fan 130 meets longitudinal axis 50. In accordance with the present invention, the intersection of first tangent plane 121 and second tangent plane 131 forms an angle 880 which preferably is more than 90° and less than 180°, more preferably between about 120° and about 170°, and most preferably about 160°. Indeed, this is the same relationship as exists between the fans of rake 30 of FIGS. 3–8, where the first and second tangent planes 202, 204 are coincident with the first and second fans themselves.

Figure 13:
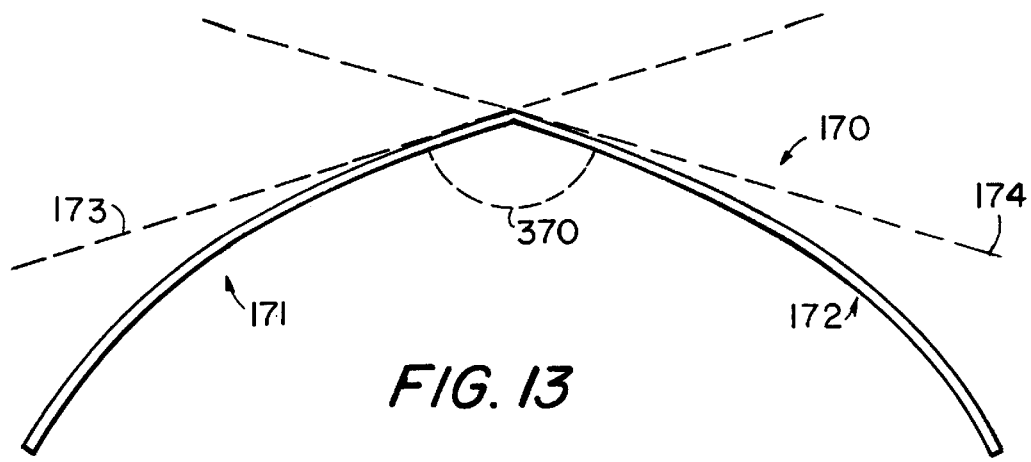
FIG. 13 is an elevational view of one alternative crossbar for use in the rake of FIGS. 11 and 12.
Figure 14:
FIG. 14 is an elevational view of a second alternative crossbar for use in the rake of FIGS. 11 and 12.

Rake 110 may preferably have one of alternative crossbars 170, 270, shown in FIGS. 13 and 14, respectively, instead of crossbar 70. Unlike crossbar 70, which has substantially straight segments 72, 74, crossbars 170, 270 have curved segments 171, 172 to accommodate curved fans 120, 130. In crossbar 170, curved segments 171, 172 meet at angle 370 as defined by tangent lines 173, 174 at the point at which they meet. Angle 370 is preferably substantially equal to angle 880.

In crossbar 270, curved segments 171, 172 meet at substantially a straight angle (180°)—i.e., crossbar 270 forms a substantially smooth arc. Thus, if crossbar 270 were used, the angle between tangent planes 121, 131 would be 180°.

It will be understood, although it is not shown, that crossbars 170, 270 would be attached to the underside of handle 32 so that segments 171, 172 do not bind on handle 32 when crossbar 170, 270 pivots. Alternatively (not shown), a flat pivot area could be provided between segments 171, 172, which could be attached above or below handle 32 or in slot 79 as in the case of crossbar 70 with flat pivot area 76.

Thus a rake which permits right-handed or left-handed use and allows the user to rake lawns without having the raking fingers or the leaves pass over the user's feet has been described. One skilled in the art will appreciate that the present invention can be practiced by other than the described embodiments, which are presented for purposes of illustration and not of limitation, and the present invention is limited only by the claims which follow.

What is claimed is:

1. A rake comprising:

a handle having a longitudinal axis;

a plurality of raking fingers forming a first fan and a second fan, said first and second fans defining a first tangent plane and a second tangent plane, said first and second tangent planes being tangent to said first and second fans, respectively, substantially along a line at which said first and second fans meet said longitudinal axis, said first and second tangent planes formed an angle greater than 90° and at most 180° with respect to one another, each of said raking fingers having a proximal end and a distal end;

a clamp for movably securing said proximal end of said raking fingers to said handle;

a crossbar having two segments meeting at a junction, said segments meeting substantially at said angle with respect to one another, said crossbar pivotably attached to said handle at said junction, each respective one of said raking fingers being pivotably attached to said crossbar at a point between said proximate end and said distal end of said respective one of said raking fingers; and an actuator movable between a first position and a second position, said actuator connected to (1) said handle and (2) one of (a) said crossbar and (b) one of said raking fingers, for pivoting said crossbar relative to said handle; whereby:

said distal ends of said fingers in said first fan form a first raking edge, and said distal ends of said raking fingers in said second fan form a second raking edge;

when said actuator is in said first position, said first raking edge is longer than said second raking edge; and when said actuator is in said second position, said second raking edge is longer than said first raking edge.

2. The rake of claim 1 wherein said fans are planar, said angle is greater than 90° and less than 180°, and said segments are straight.

3. The rake of claim 1 wherein said first and second fans are arcuate and said segments are arcuate.

4. The rake of claim 1 wherein said clamp has a face having two edges running at respective oblique angles with respect to said longitudinal axis, said clamp having a respective elongated slot substantially adjacent each of said edges.

5. The rake of claim 4 wherein:

each of said first and second fans has a respective outermost raking finger, being the furthest respective one of said raking fingers from said longitudinal axis;

and said proximal end of each respective one of said outermost raking fingers is restricted to move along a respective one of said slots in said face of said clamp.

6. The rake of claim 1 wherein said angle is between about 120° and about 170°.

7. The rake of claim 6 wherein said angle is 160°.

8. The rake of claim 1 wherein said raking fingers are attached to said crossbar at substantially equal intervals.

9. The rake of claim 1 wherein said actuator comprises a collar movably secured to said handle and a link attached to said collar and to one of (a) said crossbar and (b) one of said raking fingers.

* * * * *